United States Patent Office 3,810,820
Patented May 14, 1974

3,810,820
URATE OXIDASE AND PROCESS FOR THE PRODUCTION THEREOF
Pierre Laboureur, Neuilly-sur-Seine, Marcel Daniel Pierre Brunaud, Paris, and Claude Langlois, Montrouge, France, assignors to Societe d'Etudes et d'Applications Biochimiques, Yvelines, Etablissements Clin-Byla and Ugine-Kuhlmann, both of Paris, France
No Drawing. Continuation-in-part of application Ser. No. 715,623, Mar. 25, 1968, now Patent No. 3,620,923. This application Sept. 13, 1971, Ser. No. 180,220
Claims priority, application France, Mar. 29, 1967, 100,672, 100,673
Int. Cl. C07g 7/02; C12d 13/10
U.S. Cl. 195—62                                    1 Claim

ABSTRACT OF THE DISCLOSURE

The invention relates to a new enzyme or urate oxidase which is very active in promoting oxidation of uric acid to allantoin. The urate oxidase is produced by fermentation under aerobic conditions of nutrient media containing sources of assimilable carbon, assimilable nitrogen and uric acid which have been seeded with suitable cultures of bacteria, fungi or yeasts. Isolation and purification of the urate oxidase is described.

---

This application is a continuation-in-part of Ser. No. 715,623 filed Mar. 25, 1968, now U.S. Pat. No. 3,620,923.

This invention relates to a novel urate oxidase having a high activity (currently known by the name "uricase"), as well as to a process for the manufacture thereof.

It is known that uric acid is one of the principal products of the catabolism of purine bases and of the products which they contain, such as nucleic acids. It is also known that if catabolism does not take place or elimination of uric acid does not occur, this product can accumulate in the blood or the tissues and can be the cause of many disorders, especially of gout, certain forms of rheumatism, certain calculi in the region of the urinary system and various tissue changes, especially in the cardio-vascular system.

These disorders occur frequently, because elimination of uric acid is rendered difficult by the very low solubility of this compound and, consequently, increased concentrations of this compound due to any cause can bring about the formation of insoluble deposits.

The uricase of the present invention is obtained from active strains of micro-organisms which are either bacteria, especially those of the genus Bacillus, or fungi especially those which belong to the genera Mucor, Rhizopus, Absidia, Fusarium, Alternaria, Penicillium, Aspergillus, Cephalosporium, Stemphylium and Macrosporum, or yeasts, especially of the genus Geotrichum. These genera belong to the orders of eubacteriales, actinomycetales, mucorales, moniliales, spheriales and endomycetales.

The uricase may also be obtained using bacteria of the genera Pseudomonas, Clostridium, Micrococcus and Bacterium, fungi of the genus Neurospora and yeasts of the genera Saccharomyces and Torula (Candida).

The invention comprises more particularly the production of the uricase using bacteria and fungi belonging to the species *Streptomyces cellulosae* and *Strept. sulfureus*, *Bacillus megatherium*, *B. subtilis* and *B. cerus*, *Aspergillus flavus*, *Asp. oryzae*, *Asp. tamarii*, *Asp. terricola*, *Asp. luchuensis*, *Asp. niger*, *Asp. sydowi*, *Asp. nidulans*, *Asp. wentii*, *Asp. fonsecaeus*, *Asp. clavatus*, *Asp. ustus*, *Asp. terreus* and *Asp. ochraceus*, *Penicillium frequentans*, *Pen. granulatum*, *Pen. griseum*, *Pen. canescens*, *Pen. spinulosum*, *Pen. thomii*, *Pen. waksmani*, *Pen. raistrickii*, *Pen. expansum*, *Pen. purpurescens*, *Pen. funiculosum*, *Pen. spiculisporum*, *Pen. velutinum*, *Pen. purpurogenum*, *Pen. lilacinum*, *Pen. rubrum*, Cephalosporium, *Alternaria tenuis*, *Fusarium solani*, *Fus. moniliforme*, *Fus. coeruleum*, *Fus. oxysporum* and *Fus. orthoceras*, *Stemphylium macrosporoideum*, *Macrosporium apiospermum*, *Absidia glauca*, *Mucor mucedo*, *Mucor hiemalis* and *Mucor racemosus*, *Rhizopus arrhizus* and of the class Basidiomycetes, as well as the yeast *Geotrichum candidum*.

Suitable micro-organisms are given below. In this list each name is followed by the number assigned by the applicants to the strain in their collection and in brackets by the registered number of the strain deposited in the American Type Culture Collection (A.T.C.C.).

(a) BACTERIA

*Streptomyces cellulosae* Krainsky 3313(21184), *Streptomyces sulphureus* Krainsky 105(21185), *Bacillus megatherium* of Barry 1552(21180), *Bacillus megatherium* of Barry 1551(21181), *Bacillus subtilis* Cohn 5221(21183) and *Bacillus cereus* Frankland 1665(21182).

(b) FUNGI OTHER THAN YEASTS

*Aspergillus flavus* Link 601(20037), *A.f.* Link 602 (20038), *A.f.* Link 603(20039), *A.f.* Link 604(20040), *A.f.* Link 605(20041), *A.f.* Link 606(20042), *A.f.* Link 608(20043),*A.f.* Link 609(20044), *A.f.* Link 620(20045), *A.f.* Link 623(20046), *A.f.* Link 624(20047), *A.f.* Link 625(20048), *Aspergillus oryzae* Cohn 626(20049), *A.o.* Cohn 627(20050), *A.o.* Cohn 628(20051), *A.o.* Cohn 629(20052), *A.o.* Cohn 634(20053), *Aspergillus tamarii* Kita 636(20054), *Asp. terricola* Marchal 638(20055), *Asp. luchuensis* Inui 651(20056), *Asp. niger* Van Tieghem 561(20057), *Asp. sydowi* Bainier and Sartory 661 (20058), *Asp. nidulans* Wint 682(20059), *Asp. wentii* Wehmer 579(20060), *Asp. fonsecaeus* Bainier 808 (20061), *Asp. clavatus* Blochwitz 549(20062), *Asp. ustus* Thom and Church 575(20063), *Asp. terreus* Thom 1960 (20064), *Asp. ochraceus* Wilhelm 585(20065), *Penicillium frequentans* Westling 499(20066), *Pen. granulatum* 503 (20067), *Pen. griseum* Thom 505(20068), *Pen. canescens* Sopp 485(20069), *Pen. spinulosum* Thom 521(20070), *Pen. thomii* Maire 525(20071), *Pen. waksmani* Zaleski 531(20072), *Pen. raistrickii* (Smith) 517(20073), *Pen. expansum* Thom 597(20074), *Pen. purpurescens* Sopp 540(20075), *Pen. funiculosum* Thom 545(20076), *Pen. spiculisporum* Lehman 547(20082), *Pen. velutinum* (Van Beyma) 527(20081), *Pen. purpurogenum* Stoll 515 (20077), *Pen. spinulosum* Thom 522(20078), *Pen. lilacinum* Thom 535(20079), *Pen. rubrum* Stoll 525(20080), Cephalosporium sp. Corda 901(20083), *Alternaria tenuis* Nees 225(20084), *A. tenuis* 415(20085), *Fusarium solani* Appel & Wollenweber 478(20086), *Fus. moniliforme* Sheldon 727(20087), *Fus. coeruleum* Saccardo 727 (20088), *Fus. oxysporum* Schelechtendahl 735(20089), *Stemphylium macrosporoideum* Saccardo 700(20090), *Macrosporium apiospermum* 653(20091), *Fusarium orthoceras* Appel & Wollenweber 729(20092), *Absidia Glauca*+(Hagem) 1801(20093), *Mucor mucedo* Brefeld 1202(20094), *Mucor hiemalis* Wehmer 1205(20095), *Mucor racemosus* Fresnius 1209(20096), *Rhizopus arrhizus* Fisher 1212(20097), Basidiomycete sp. 1500 (20098).

(c) YEASTS

*Geotrichum candidum* Link 801(20099)

The invention also includes a process for producing and purifying the urate oxidase thus making it possible to obtain the product in a very active form. This activity, expressed in uricase units, in accordance with a definition which will be given hereafter, is generally between 10 and 500 units per milligram. The method of measuring the activity is described subsequently.

In accordance with the present invention there is provided a process for producing a urate oxidase which promotes the oxidation of uric acid to allantoin which comprises cultivating an active strain of a bacterium, a fungus or a yeast in or upon an aqueous nutrient medium comprising an assimilable source of carbon, a source of assimilable nitrogen, and uric acid under conditions of aerobic fermentation, separating the culture from the aqueous medium and isolating said urate oxidate from the culture and/or from the resulting aqueous medium.

The process of the invention involves cultivating the urate oxidase producing micro-organism, either by using a submerged pre-culture, sparsely or not sporulated, entirely in a liquid medium which is suitably agitated and aerated, making it possible to produce considerable amounts of the microorganism, preferably at temperatures between 20 and 35° C. and during 4 to 12 days of cultivation, or by cultivation entirely upon a solid medium making it possible to obtain spores at temperatures between 20 and 35° C. during 6 to 15 days of cultivation. The thus prepared inoculum is used to seed a nutrient medium containing urate ions and in effecting fermentation at a temperature which is preferably between 20 and 35° C. The microbiological mass is separated from the liquid phase, preferably when maximum production has been attained, and the urate oxidase is extracted from the microbiological mass and/or from the liquid phase. The crude urate oxidase thus obtained is then purified.

In preparing the inoculum pre-cultivation in depth may be carried out in a Czapeck-Dox or in a Sabouraud medium. If it is desired to use a solid medium, the culture may be effected upon malted rice.

Extraction of the endocellular urate oxidase from the micro-biological mass may be effected by solidifying this mass, pulverizing it and submitting the pulverized material to a solid-liquid extraction procedure.

A preferred strain of mycelium which is highly active, is one obtained from an enriched culture of the genus Aspergillus and of the species *flavus*. However, the process is applicable to other micro-organisms which produce endocellular urate oxidase in particular but not exclusively to those micro-organisms which have been set out above. An analogous process may be used for those micro-organisms which produce exocellular urate oxidase, by treating the filtrates of the culture medium in the same manner as the cellular extracts of micro-organisms which produce the endocellular urate oxidases.

CULTURE MEDIUM

The culture media should contain all the organic and inorganic constituents which are necessary for satisfactory development of the micro-organism and for the production of uricase in high yield. They should contain: (a) a source of assimilable carbon, in particular but not exclusively simple sugars such as glucose or saccharose, alone or in admixture, in concentrations between 1 and 10% by weight (with respect to the total weight of the culture medium); (b) a source of assimilable nitrogen which is usually supplied in the form of inorganic nitrogen, such as ammonium chloride or sulphate, or an alkali nitrate, in concentrations between 1 and 10% by weight; and (c) inorganic elements such as phosphorus, magnesium, potassium, sodium, calcium and iron, in concentrations generally between 0.0001 and 0.5% by weight, as well as uric acid, in an amount between 0.01 and 0.2% by weight as an inductor.

The above ingredients may be supplemented by oligodynamic substances such as amino acids, vitamins and growth factors, nucleotides and inorganic trace elements such as manganese, molybdenum, copper, cobalt and zinc. Depending upon their nature, these substances may be supplied, for example, by yeast extracts, malt extracts or by the hydrolysis products of animal and/or vegetable proteins or by inorganic salts. These may be used in concentrations between 0.0001 and 0.5% by weight.

The various constituents, previously sterilized, can be added either partially or entirely when preparing the culture medium, prior to seeding, or during the course of the fermentation and, in the case of certain elements, on account of their special importance, during the synthesis of the enzyme. The constituents are essentially, but not exclusively, nitrogen and phosphorus-containing constituents and uric acid.

CULTIVATION CONDITIONS

Cultivation is generally effected in depth employing agitation and aeration. Agitation may be by stirring which may vary, depending upon the installation used, between 10 and 200 r.p.m. Aeration is preferably effected at a rate between 0.05 and 0.5 litres of medium per minute. Sufficient agitation can be achieved by bubbling through air. It should be noted however that agitation and aeration conditions which lead to too rapid and too intensive development of the mycelium may be prejudicial to optimum production of the enzyme.

It is desirable to maintain the medium during the entire cultivation period a temperature between 20 and 35° C. and it is preferably 30° C., and a pH between 4 and 8, preferably 6.5.

DURATION OF THE CULTIVATION

Cultivation is continued, preferably, until optimum enzyme activity is attained, this being determined by the analytical method which will be subsequently described. It is recommended that the fermentation be carried out to a substantially constant value of optimum enzyme activity, rather than to a value, which is possibly greater but is transitory. The culture generally attains maximum activity after from 15 to 60 hours culture; this time varies with the nature of the culture medium, the strain of inoculum employed and the conditions of cultivation.

EXTRACTION OF THE ENZYME

When fermentation is complete the culture medium is filtered in order to separate the mycelium; the latter is washed with water and thereafter pulverized for the purpose of extracting the uricase. In order to carry out pulverisation it is possible to freeze the mycelium at low temperatures by means of carbon dioxide ice or carbon dioxide snow or by any other process which makes it possibile to freeze the mycelial mass rapidly and completely. Preferably freezing is carried out at temperatures between $-15$ and $-30°$ C. The mycelium is thereafter pulverized in an apparatus which enables complete separation of the mycelial constituents, without modifying the enzyme.

The pulverized product is extracted in water containing a buffer agent or in aqueous ammonia, brought to a pH which is preferably between 7 and 10, preferably 8.5, for the purpose of extracting the enzyme. This operation is carried out at a temperature below 30° C. by using a suitable extraction process. Moreover, in order to render the extract more stable a complexing agent may be added in a concentration of the order of 0.001 M, for example ethylenediamine tetraacetic acid, generally in the form of the sodium salt. The suspension is thereafter filtered and dried.

PURIFICATION OF THE ENZYME

The mycelial extract thus obtained contains the uricase together with numerous proteins and other substances, in solution or in a colloidal state; they may have to be removed by desiccation or by means of salts with which they form complexes. Suitable salts include calcium salts, such as calcium chloride and lead salts such as lead acetate, which make it possible to eliminate a great number of impurities in the form of insoluble compounds. Furthermore, as the extract itself easily undergoes fermentation, and is consequently rather perishable, there may be added to it an antibiotic such as chloramphenicol, or an antiseptic, for example sodium azide, in amounts which may be between 10 and 500 μcg./ml., preferably 100 μcg./ml.

The uricase, being soluble in water but insoluble in organic solvents and in concentrated aqueous solutions of inorganic salts such as ammonium sulphate, can be recovered easily, either by precipitation with the aid of an organic liquid which is miscible with water, for example ethanol, methanol or isopropanol or more preferably acetone, used in the proportion of 0.5 to 3 volumes per volume of extract, or by salting out with a water-soluble salt especially with a saturated solution of ammonium sulphate at room temperature, also used in a proportion of 0.5 to 3 volumes per volume of extract.

If desired, the mycelial extract may first be concentrated, by carrying out the operation under reduced pressure at a temperature below 40° C.

The precipitate thus obtained is separated, for example by centrifuging. The organic liquid which it contains is removed rapidly under reduced pressure, without applying heat. The precipitate can then be dissolved in water for the purpose of lyophilization, after filtration or centrifuging, which results in the production of a semi-purified product. In order to obtain a sterilized product, filtration using membranes of a filter candle is carried out prior to lyophilization.

In the case of precipitation by salting out, the salts may be removed either by dialysis or by rapid filtration using a suitable molecular sieve, for example, a dextran gel or a polyacrylamide gel.

It is possible to combine the two operations, for example, to submit an aqueous extract obtained by dissolving a crude precipitate obtained by precipitation from acetone in a buffer solution at a pH 8.5 to a salting out process.

It may be necessary to purify the substance still further, for example by means of a series of precipitations from aqueous media, generally fractional precipitations, using organic liquids miscible with water or aqueous solutions containing ammonium sulphate. It is also possible to make use of adsorption upon hydroxyapatite, bentonite and alumina and subsequent extraction, followed by elution using saline solutions. The purification can be carried still further by subjecting the thus treated products to chromatography, which may be a cyclic or non-cyclic process, by making use of columns of substances which make it possible to eliminate those impurities, in particular proteins, which are still present in the extract. The substances which can be used for this purpose include columns of cellulose ion exchange materials, dextrans and polyacrylamides. Elution may be effected by means of liquids in which there is a continuous or discontinuous change in the pH or in the molarity thereof.

The uricase is obtained in the form of an amorphous, colorless or slightly yellow powder which is soluble in water and the conventional buffer solutions, the solubility being greater in alkaline solution than in an acid solution. It is insoluble in the usual organic solvents such as ethanol, methanol, acetone, diethyl ether and chloroform. The pH of solutions having optimum activity is 8.5 and the temperature at which the uricase exhibits optimum activity is 30°, the activity is, however still quite high at 37° C. The activity of the uricase is partially inhibited by the following cations: $Zn^{++}$, $Cd^{++}$, $Mn^{++}$, $Fe^{+++}$, $Co^{++}$, $Ni^{++}$, $Al^{+++}$ at concentrations of $10^{-4}$ and $10^{-5}$ M, and by $Hg.^{++}$ at a concentration of $10^{-6}$ M. $Cu^{++}$ is a weak inhibitor (30% inhibition at $10^{-3}$ M). Calcium, sodium, potassium, magnesium and ammonium ions either do not or only slightly inhibit activity up to concentrations of $10^{-1}$ M.

The following anions: borate, carbonate, acetate, citrate, nitrate, chloride and phosphate have no effect on the uricase at concentrations of $10^{-6}$ to $10^{-3}$ M; however the nitrate and chloride anions can become partial inhibitors at concentrations of the order of $10^{-1}$ M.

The uricase has no effect upon caffeine, theobromine, theophylline, xanthine, 8-chloroxanthine of 2,8-dithio-6-hydroxypurine, that is to say, upon the principal biological products the chemical structure of which is closely similar to that of uric acid. Consequently this enzyme can be regarded as extremely specific.

In solution the activity of the uricase is protected by animal blood serum.

Further characteristics of our new highly purified urate oxides are as follows:

Molecular weight

We worked according to J. R. Whitaker (Anal. Chem. 1963, 35, 1950) employing a Sephadex G 100 column buffered with a 0.01 M phosphate solution having a pH 7 and containing 0.1 N sodium chloride. The same method was also used with a Sephadex G 150 column in the same conditions. Highly purified commercial cytochrom C, ribonuclease, chymotrypsinogen, trypsin, pepsin, ovalbunin, serum albumin and γ-globulin were employed as controls. Each column has a height of 90 cm. and a diameter of 1.5 cm.; associated therewith was an automatic fraction collector LKB the velocity of flow was 8 ml. per hour; the above control proteins were deposited on each column in an order which was the reverse of their molecular weight order, at intervals which were a function of their respective molecular weight. Dextran blue was employed to measure the gel exclusion volume; deposition thereof corresponded to the beginning of the experiments.

Our urate oxidase was found to have a molecular weight between those of serum albumin and γ-globulin, more specifically an average molecular weight of 93.000 ±3.000 in view of the molecular weight allotted to the last two proteins in the literature.

Iso-electric weight

Our urate oxidase was found to have an iso-electric weight of 6.2±0.1 (6.8 for hemoglobin as a control).

Aminoacid content

The following table shows the nature and percentage (reckoned on urate oxidase dry weight) of the aminoacids in our urate oxidase.

Amino-acids: Per 100

| | |
|---|---|
| Lys | 8.55 |
| His | 4.11 |
| Arg | 5.08 |
| Asp | 11.42 |
| Thr | 6.6 |
| Ser | 5.84 |
| Glu | 12 |
| Pro | 2.59 |
| Gly | 2.34 |
| Ala | 3.39 |
| Cyst | 0.76 |
| Val | 6.52 |
| Met | 1.13 |
| Ileu | 5.05 |
| Leu | 6.67 |
| Tyr | 4.35 |
| Phe | 4.35 |

The following examples illustrate the new uricase and its preparation.

EXAMPLE 1

Strain: *Aspergillis flavus oryzae* No. 624 (A.T.C.C. No. 20047).

Inoculum: Sporulated culture, grown on rice for 9 days at 28° C. in two Roux bottles each of 1 litre capacity and then taken up in two litres of physiological salt solution containing 6 g. of sodium chloride per litre.

Culture medium:

| | | |
|---|---|---|
| Partially crystalline glucose of high dextrose content | kg | 40 |
| Sodium nitrate | kg | 3 |
| Dipotassium hydrogen phosphate | kg | 0.750 |
| Monopotassium dihydrogen phosphate | kg | 0.250 |
| Calcium carbonate | kg | 1 |
| Magnesium sulphate (7 $H_2O$) | kg | 0.500 |
| Ferrous sulphate (7 $H_2O$) | g | 1 |
| Cobalt sulphate (7 $H_2O$) | g | 10 |
| Yeast extract | kg | 1 |
| Soluble extract of maize | kg | 0.300 |
| Uric acid | kg | 0.600 |

Water in an amount sufficient to make 1000 litres pH of the culture medium: 6.45.

The culture medium was sterilized for 30 minutes at 120° C. Seeding after cooling with the inoculum described above.

Cultivation: during cultivation the temperature of the culture medium is maintained at 28° ± 1° C., the culture medium is aerated by means of sterile air blown in to the bottom of the container at a rate of 0.3 litres per litre of culture medium per minute. After 24 hours of cultivation under the indicated conditions 20 kg. of mycelium having a content of 150 $\mu$./g. of uricase is obtained. The mycelium is washed with 40 litres of sterile distilled water and then cooled rapidly to −20° C.

To separate the enzyme the mycelium is frozen at −20° C., pulverized and then taken up in 40 litres of aqueous ammonia having a pH 9; after concentrating the solution to one-quarter of its original volume under reduced pressure and precipitation by addition of two volumes of acetone, 380 g. of a crude product containing 7000 $\mu$./g. of uricase is obtained. This product is taken up in 3.8 litres of a 0.002 M aqueous sodium carbonate solution. After centrifuging the solution is treated with an equal volume of a saturated aqueous solution of ammonium sulphate. The precipitate thus obtained is separated by centrifuging, then taken up in an aqueous solution of 0.002 M sodium carbonate; the insoluble remainder is eliminated by centrifuging. The supernatant solution is then freed from inorganic constituents using a column of a dextran gel buffered with 0.002 M sodium carbonate, and the active eluates are sterilized by passing them over a Millipore GS membrane and are then lyophilized. 57 g. of a product containing 49,000 $\mu$./g. of uricase are thus obtained.

EXAMPLE 2

Strain: *Aspergillus flavus oryzae* No. 624.

Inoculum: This is prepared by seeding 2 litres of a Saboraud liquid medium with an agar culture on a Czapeck-Dox culture medium. After 40 hours cultivation this culture is used for inoculating 100 litres of a fermentation liquid containing the same culture medium as in Example 1. At the end of 30 hours cultivation at 28° C. this second inoculum is used for seeding the actual fermentation medium.

Culture medium:

| | | |
|---|---|---|
| Glucose as used in Example 1 | kg | 100 |
| Saccharose | kg | 15 |
| Sodium nitrate | kg | 6 |
| Dipotassium hydrogen phosphate | kg | 2.250 |
| Monopotassium dihydrogen phosphate | kg | 0.750 |
| Calcium carbonate | kg | 3 |
| Magnesium sulphate 7 $H_2O$ | kg | 1 |
| Ferrous sulphate 7 $H_2O$ | g | 3 |
| Soluble extract of maize | kg | 1 |
| Malt extract | kg | 1 |
| Casein hydrolysate | kg | 0.300 |
| Copper sulphate | g | 1 |
| Uric acid | kg | 2 |

Water in an amount sufficient to make 3000 liters. The culture medium was sterilized for 1 hour at 120° C. Seeding, after cooling, was carried out with the inoculum produced as described above.

Cultivation: During cultivation the temperature of the culture medium is maintained at 30° ±1° C. and the culture medium is agitated by means of a propeller revolving at 150 r.p.m. The culture medium is aerated by means of sterile air at the rate of 0.2 liters/liter of culture medium per minute. After 31 hours of cultivation there is added to the culture medium 2 kg. of sodium nitrate, 0.5 kg. of yeast autolysate and 0.5 kg. of uric acid, all of which have been previously sterilized. After 43 hours of cultivation 60 kg. of mycelium containing 140 $\mu$./g. of uricase is obtained. The mycelium is washed with sterile distilled water and then rapidly cooled to −20° C. The frozen mycelium is pulverized and then extracted by means of 120 liters of aqueous ammonia having pH 9. After filtration the pH of the extract is readjusted to 9 and the volume of this extract reduced to 40 liters by concentration under reduced pressure. The concentrated product is purified by treatment with an aqueous solution of basic lead acetate containing 10% by weight of lead. After centrifuging the supernatant liquid which contains the uricase is admixed with 48 liters of a saturated aqueous solution of ammonium sulphate. The precipitate obtained is separated by centrifuging, taken up in 2.5 liters of a 0.002 M aqueous sodium carbonate solution and then passed through a column of a dextran gel. The active eluates are lyophilized and there is thus obtained 54 g. of a product containing 91,000 $\mu$./g. of uricase.

EXAMPLE 3

The process described in Example 2 is repeated and there is obtained 58 g. of a product containing 87,000 $\mu$./g. of uricase. This product is dissolved in a 0.01 M ammonium carbonate solution and the solution, buffered by a 0.01 M aqueous solution of ammonium carbonate at pH 9 is passed over a column of diethylaminoethyl cellulose. The column is subsequently washed with a 0.05 M ammonium carbonate solution. The uricase is eluted from the column by increasing the molarity of the buffer solution during the course of the elution. There is obtained in liquid form the equivalent of 4.7 g. of a product contain 340,000 $\mu$./g.

EXAMPLE 4

4.7 g. of the purified product obtained as described in Example 3 is subjected to further purification in the following way:

The most active fractions obtained by elution during chromatography on a column of diethylaminoethyl cellulose are concentrated under reduced pressure until their volume is brought to one-sixth of their original volume and the concentrated product is then passed through a column of a dextran gel. By selecting the most active eluates there is obtained in liquid form the equivalent of 1.1 g. of a product corresponding to 520,000 $\mu$./g. of uricase.

In Examples 3 and 4 the activity is expressed specifically by reference to the total activity to the quantity of proteins contained in solution, determined by the microbiuret reaction, whereas in Examples 1 and 2 it is expressed with reference to the weight of the dry product.

The uricase of this invention renders possible the rapid, specific and intensive elimination of uric acid and of urates present in the animal organism by conversion into water-soluble allantoin. It can be used, in particular, as a laboratory product in research and analytical studies of uric acid.

METHOD OF DETERMINATION OF URICASE

The method of determining the urate oxidase or uricase used by the applicants is given below.

(1) Principle

The uricase of microbiological origin catalyses the oxidation of uric acid to form allantoin in the presence of oxygen according to the reaction:

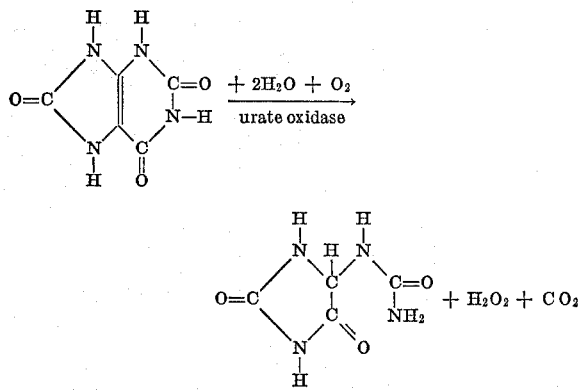

The activity is measured by determining the quantity of uricase required, under conditions hereafter described, to oxidize one half of the uric acid present in the reaction medium. The determination is based upon the fact that the optical density of a solution of uric acid falls after incubation with the enzyme preparation. Uric acid in acid solution has a maximum absorption in ultraviolet light at 285 millimicrons. The optical density under the conditions of the determination is proportional to the concentration of the uric acid and this fact makes it possible to measure the uric acid utilized and, consequently, to determine the activity of the enzyme.

The unit of uricase activity is the quantity of enzyme which brings about the destruction of one half of the quantity of the substrate, that is of the uric acid introduced initially under the conditions of the determination.

(2) Reagents (a) purified uric acid No. 6671 "Grade C" from California Biochemical Research,
(b) tris-(hydroxymetryl)aminoethane (abbreviated to "Tris"), a highly pure product from Fluka,
(c) Complexon III (disodium salt of ethylenediamine tetracetic acid) manufactured for the analysis of Prolabo, reference 20,302,
(d) chlorhydric acid for the analysis of Prolabo, reference 20,252.

(A) Preparation of the reagents (a) Primary solution of Tris+"Complexon III".—6.05 g. of Tris are dissolved in about 100 ml. of distilled water and 373 mg. of Complexon III are dissolved in 50 ml. of distilled water, the two solutions being admixed and made up to 500 ml. with distilled water;

(b) 0.05 M buffered solution of Tris having pH 8.5.— To 250 ml. of the primary solution (a) there is added about 150 ml. of distilled water, the pH is adjusted to 8.5 with 0.2 N hydrochloric acid, the solution then transferred to a 500 ml. graduated flask and made up to 500 ml. with distilled water;

(c) Primary solution of uric acid.—100 mg. of uric acid are dissolved in 50 ml. of primary solution (a), 30 ml. of distilled water is added and the pH is adjusted to 8.5, after which the solution is transferred to a 100 ml. graduated flask and made up to 100 ml. with distilled water. This solution of uric acid can be kept for one week in the cold;

(d) Solution of the substrate containing 100 µcg./ml.— The preceding primary buffered solution having a pH 8.5 is diluted tenfold (solution to be used in the daytime only).

(e) enzyme solution.—The concentration is adjusted to about 0.5 µ./ml.

(B) Procedure

Into 4 graduated culture tubes each having a capacity of 10 ml. there are introduced:

| Tube number | 1 | 2 | 3 | 4 |
|---|---|---|---|---|
| Buffered tris, ml | 5 | 4 | 3 | 2 |
| Enzyme solution, ml | | 2 | | 2 |

The culture tubes are placed upon a water bath and after a pre-incubation period of 5 minutes 1 ml. of the uric acid solution containing 100 µcg./ml. is introduced into the culture tubes 2 and 4.

The culture tubes are then left to incubate for 10 minutes at 30° C. and the reaction is stopped by adding 0.2 M hydrochloric acid.

Culture tubes 2 and 4 are respectively compared with tubes 1 and 3, which are used as controls, by means of an ultra violet spectrophotometer using a wavelength of 285 mµ.

Tubes 1 and 2 can be used as controls for a series of determinations of optical density. Tubes 3 and 4 are used for the actual determinations.

(C) Calculating the results

A standard curve for a uricase having a concentration equivalent to 50 or 100 µ./mg. is used. This curve was prepared from a fuller determination using four dilutions of the enzyme. On this standard curve the enzyme concentrations are recorded as abscissae and the optical densities obtained after the action of the uricase present in the diluted solutions are shown as ordinates. On the curve there is noted the optical density corresponding to the test and from the abscissa there is read off the dilution of the standard product which produces an activity equivalent to 2 ml. of the diluted solution used. A rapid calculation makes it possible to obtain the activity of the solution or of the initial product.

EXAMPLE

Standard: Product containing 50 µ/mg.
Concentration of the standard solution utilized is 10 µg./ml.:0.5 µ./ml.

After dilution to 1/1000 the optical density obtained after the action of 2 ml. of the diluted solution is equal to 0.500. This optical density corresponds upon the standard curve to the action of 1 ml. of standard solution.

Thus there is obtained:

$$\frac{0.5 \ \mu \times 1 \times 1000}{2} = 250 \ \mu/ml.$$

This rapid method of determination can be applied in assaying products during the course of manufacture or in assaying the final products. A more detailed method of assay using, for example, four dilutions of each product thus making it possible to construct an activity curve for each product, can be utilized for the accurate determination of the purified products.

For the purpose of conserving and utilizing the new uricase, and in particular the product which is obtained according to the preceding examples, the uricase can be lyophilized in a sterile medium under conventional conditions using an aqueous solution which has been sterilized by use of a sterilizing filter such as a Millipore filter.

The pharmacological properties of the uricase described above have been determined by means of tests which will now be described with reference to the accompanying drawings.

(1) The administration of the uricase to chickens by intra-peritoneal and intravenous administration, for the purpose of studying the actual effect upon the uricemia; especially using a dosage of 20 to 30 units/kg., administered intravenously, there is obtained a reduction in the uricemia of the order of 70% which persists for at least two hours. Figures 1 (intraperitoneal administration of the uricase) and 2 (intravenous administration) of the drawings illustrate these results in the form of two graphs, the reduction in the uricemia, expressed as a percentage of its original value being represented as ordinates, whereas the time in hours is represented as abscissae.

(2) The uricase has been administered to dogs. However, as the dog does not have any uric acid in its blood, an investigation of the uricase activity in the plasma was carried out by injecting the animals with the uricase. It was found that the enzyme persists in the blood for more than 24 hours, irrespective of whether it is administered intravenously, intramuscularly or subcutaneously.

Because the dog does not have uricemia as it possesses a natural uricase in the liver, the uricase tests have been carried out on dogs in which normal uricemia has been brought about by excluding the circulation of the liver. Under these conditions a high degree of uricemia was found to occur and it was found that administration of the uricase of the invention led to a considerable reduction and even to a complete elimination of the uricemia, as shown in Figures 3 to 6 of the drawings. Figures 3 to 5, in which the time in hours is shown on the abscissae (logarithmic scale) and in which the number of units of uricase activity per ml. of plasma is shown as ordinates, represent the uricase activity of the plasma of dogs which have not been anaesthetized but which have been treated with the uricase of the invention, administered in dosages of 38 (intravenous), 76 (intramuscular) and 152 units (subcutaneously) per kg. body weight respectively. FIG. 6 of the drawings represents the action of the uricase (110 units/kg.; intravenous) on the uricemia in dogs excluding the liver circulation; the uricemia, expressed in $\mu$cg./ml., is shown as ordinates and the time, expressed in minutes, is shown as abscissae.

(3) The uricase does not have any pronounced effect in dogs upon blood pressure, cardiac frequency, cardiac electrogenesis, tensional responses to various chemical mediators or upon the respiratory movements. It has no effect in dogs on water or inorganic diuresis.

(4) The uricase being a protein by nature behaves as an antigen. In the course of the various tests carried out in studying the antigenic effect of this product, it did not exhibit any allergic properties but only immunizing properties. A rabbit which has been hyperimmunized with uricase to which there is added the adjuvant of Freund reacts by forming antibodies which are easily detected by the method of Ouchterlony (1948, Acta. Path. Microb. Scandinav., volume 26, (1949), p. 507).

From all the tests carried out upon chickens and upon dogs it can be concluded that injection of uricase given at weekly intervals of time bring about an immunity which only disappears after several months. On the other hand daily injections only bring about a very low immunity or no immunity at all and the immunity produced is only ephemeral. The immunity is lower the higher the dose of uricase injected.

(5) The uricase has no acute toxicity. A dose of 10,000 units/kg. injected intravenously into mice causes no pathological symptoms.

(6) Numerous immunological tests in which animals were injected with various doses of uricase at different intervals of time did not show any noxious effect.

(7) Toxicity tests have been carried out upon dogs using dosages of 200 and 1000 units per animal per day. The uricase has been administered intravenously for four months without producing any abnormal phenomenon or noticeable istological modifications in the animals.

The novel uricase which will be denoted hereafter by its code number 8129 CB has, moreover, been subjected to clinical tests which will be discussed hereafter. These tests have been carried out on male adults. The uricase 8129 CB was administered intravenously, the dosage being about 1000 units at each injection. Three tests have been carried out:

Test No. 1

Four adults were given the product. Their uricemia was studied prior to injection and then 90 minutes, 3 hours, 5 hours and 24 hours after the treatment.

Test No. 2

Three adults were given the product. Their uricemia was investigated prior to treatment and then every 24 hours for 3 days. Simultaneously the urinary elimination of allantoin was studied on samples of urine taken every 24 hours.

Test No. 3

Two adults who had gout were given, each day, for 6 days per week, an ampoule containing 1000 units of 8129 CB. The uricemia was determined every 24 hours, with the exception of Saturday and Sunday. The allantoin in the urine was determined on samples of urine every 24 hours except on Saturday and Sunday. The total number of injections was 9 in one case and 10 in the other.

As a general rule there was good tolerance of the product in all cases.

Test No. 1

The results obtained are shown in Table No. 1(A) given hereafter. The uricemia diminishes to a minimium of 42% at the 24th hour in all cases.

Test No. 2

Table No. 1(B) sets out the results obtained. Twenty-four hours after treatment the extensive diminution of the uricemia observed in Test No. 1 is also found to occur here. As a corollary the urinary allantoin increases very markedly.

At the 72nd hour after treatment the quantity of allantoin eliminated is still greater than the original value and the uricemia has a tendency to return to normal.

Test No. 3

The results obtained are shown in Table No. 2. Elimination of allantoin during 24 hours reaches, in the course of 3 days, 1,500% of the original value. In one instance the uricemia is maintained at a very low value. After the 10th injection the uricemia is always greatly reduced and the quantity of allantoin excreted remains high.

TABLE NO. 1.—SINGLE INJECTION OF 8129 CB (A) Kinetics of the uricemia over a period of 24 hours

| 8129 CB, 1,000 u. i.v. | Uric acid ($\mu$cg. per ml. of plama) | | | | | Variation of the uricemia (as a percentage of the original), after treatment for— | | | |
|---|---|---|---|---|---|---|---|---|---|
| | Prior to treatment | After treatment for— | | | | | | | |
| | | 1 h. 30 m. | 3 h. | 5 h. | 24 h. | 1 h. 30 m. | 3 h. | 5 h. | 24 h. |
| Patients: | | | | | | | | | |
| Gar | 45.0 | 38.9 | 37.1 | 32.6 | 25.5 | −13.5 | −17.5 | −27.5 | −43.3 |
| Mar | 59.9 | 49.9 | 44.7 | 39.7 | 26.6 | −16.7 | −25.3 | −33.7 | −55.6 |
| Ric. (has gout) | 56.8 | 62.0 | 55.7 | 61.0 | 30.5 | +9.1 | −1.9 | +7.4 | −46.3 |
| Wen | 72.7 | 67.3 | 61.0 | 62.0 | 41.6 | −7.4 | −16.1 | −14.7 | −42.7 |

TABLE 1—Continued (B) Kinetics of the uricemia and of the urinary allantoin (periods of 24 hours)

| | Uricemia (μcg. per ml. plasma) | | | | Elimination of urinary allantoin (mg. per 24 hours) | | | |
|---|---|---|---|---|---|---|---|---|
| | Prior to treatment | After— | | | Prior to treatment | After— | | |
| | | 24 h. | 48 h. | 72 h. | | 24 h. | 48 h. | 72 h. |
| Patients: | | | | | | | | |
| Mer | 35.6 | 19.3 | 19.5 | 21.8 | | | | |
| Hou | 54.3 | 33.2 | 31.7 | 14.1 | 24.34 | 380 | 444 | 136.8 |
| Bar | 32.8 | 20.3 | 26.7 | 34.3 | 64.4 | 167.63 | 182.4 | 76.8 |

TABLE 2.—REPEATED INJECTIONS OF 8129 CB

Record of the 24 hours preceding each injection

| | | Patient: Vcg. G. | | | Patient: Ler. R. | | |
|---|---|---|---|---|---|---|---|
| Days of treatment | Dosage (units i.v.) | Diuresis (ml./24 h.) | Urinary allantoin (mg./24 h.) | Uricemia (μcg. uric acid/ml. plasma) | Diuresis (ml./24 h.) | Urinary allantoin (mg./24 h.) | Uricemia (μcg. uric acid/ml. plasma) |
| 1 | 1,000 | 2,650 | 65.7 | 70.2 | 3,200 | 54.7 | 49.2 |
| 2 | 1,000 | 1,500 | 51.3 | 38.2 | 3,300 | 621.3 | 37.8 |
| 3 | 1,000 | 2,200 | 153.8 | 15.6 | 2,500 | 754.3 | 32.3 |
| 4 | 1,000 | 2,250 | 191.5 | 6.4 | 2,500 | 961.9 | 28 |
| 5 | | | | | | | |
| 6 | | | | | | | |
| 7 | 1,000 | | 216 | 14 | | 668 | 35.9 |
| 8 | 1,000 | | 300 | 8.8 | | 777 | 34.3 |
| 9 | 1,000 | | 222.2 | 7.9 | | 835.2 | 18.4 |
| 10 | 1,000 | | 249.6 | 8.1 | | 693.1 | 29.3 |
| 13 | 1,000 | | | | | | |

The uricase of the invention can be used in human therapeutics in the treatment of hyper-uricemia and, more generally, for resolving the pathological problems which occur when an excess of uric acid or of salts thereof are present. The uricase can be administered parenterally, notably by the intravenous, subcutaneous or intramuscular routes, or by oral or endorectal administration.

An example of a pharmaceutical composition for intravenous administration is that of an aqueous solution which contains, at the time of application, 1000 units of lyophilized and sterilized uricase and 5 ml. of a sterilized solvent having the following formula:

Sodium bicarbonate _____mg__ 840
Glucose _____g__ 50
Distilled water in an amount sufficient for 1000 ml.

The lyophilization of the uricase was carried out in a sterile medium under the usual conditions, using an aqueous solution which had been sterilized on a sterilizing filter such as the Millipore filters.

It is likewise possible to use aqueous solutions, ready for use, of a highly purified uricase containing 200 to 500 mμ/mg., by storing the solutions at a sufficiently low temperature, the solutions being prepared from the highly purified uricase and from an aqueous solution of ammonium carbonate having a concentration of 0.1 M ammonium ions, this solution having been brought to pH 8 by means of carbon dioxide. A solution containing, for example, 200,000 units of uricase per 1000 ml., is sterilized by filtration and is introduced in a sterile manner into sterile ampoules, at the rate of 5 ml. per ampoule.

We claim:

1. A urate oxidase in the form of an amorphous, colorless or pale yellow powder which
   (a) has an average molecular weight of 93,000±3,000,
   (b) is soluble in water and in aqueous buffered solutions, the solubility being greater in alkaline than in acid media and is insoluble in methanol, ethanol, acetone, diethyl ether and chloroform,
   (c) exhibits maximum activity as an oxidant of uric acid to allantoin at pH 8.5 and at 30° C., the activity nevertheless being substantial at 37° C.,
   (d) is partially inhibited by the presence in aqueous solution of any of the cations $Zn^{++}$, $Cd^{++}$, $Mn^{++}$, $Fe^{+++}$, $Co^{++}$, $Ni^{++}$, $Al^{+++}$ at concentrations of $10^{-4}$—$10^{-5}$ M, by $Hg^{++}$ at a concentration of $10^{-6}$ M and by $Cu^{++}$ at $10^{-3}$ M,
   (e) is unaffected by the presence in aqueous solution of any of the cations $Ca^{++}$, $Na^+$, $K^+$, $Mg^{++}$ and $NH_4^+$, at concentrations not exceeding $10^{-1}$ M,
   (f) is unaffected by the presence in aqueous solution of any of the anions borate, carbonate, acetate, citrate, nitrate, chloride and phosphate at concentrations of $10^{-6}$ M to $10^{-2}$ M, the chloride and nitrate ions becoming partial inhibitors of activity at concentrations of $10^{-1}$ M,
   (g) without action upon caffeine, theobromine, theophylline, xanthine, 8-chloroxanthine and 2,8-dithio-6-hydroxy-purine, and
   (h) contains the following acids in the following proportions by weight

| Amino-acids | Per 100 | Amino-acids | Per 100 |
|---|---|---|---|
| Lys | 8.55 | Ala | 3.39 |
| His | 4.11 | Cyst | 0.76 |
| Arg | 5.08 | Val | 6.52 |
| Asp | 11.42 | Met | 1.13 |
| Thr | 6.6 | Ileu | 5.05 |
| Ser | 5.84 | Leu | 6.67 |
| Glu | 12 | Tyr | 4.35 |
| Pro | 2.59 | Phe | 4.35 |
| Gly | 2.34 | | | and is obtained by cultivating *Aspergillus flavus oryzae* No. 624 (ATCC No. 20,047).

References Cited

UNITED STATES PATENTS 3,431,176  3/1969  Fukumoto et al. _____ 195—66
3,475,276  10/1969  Kano _____ 195—66

OTHER REFERENCES

Kida et al.: Journal of Fermentation Technology, vol. 44, No. 11, pp. 789–796 (1966).

Kida et al.: Journal of Fermentation Technology, vol. 44, No. 11, pp. 797–804 (1966).

LIONEL M. SHAPIRO, Primary Examiner